United States Patent [19]
deSilva et al.

[11] Patent Number: 5,500,924
[45] Date of Patent: Mar. 19, 1996

[54] METHOD FOR VECTOR PLOTTING A BITMAP WITH A REDUCED NUMBER OF LINES

[75] Inventors: Mahinda K. deSilva, Santa Clara; L. Bayles Holt, San Jose, both of Calif.

[73] Assignee: Apple Computer, Inc., Cupertino, Calif.

[21] Appl. No.: 880,134

[22] Filed: May 7, 1992

[51] Int. Cl.$^6$ .................................................. G06T 5/00
[52] U.S. Cl. .................... 395/129; 395/103; 395/128; 395/133; 395/143
[58] Field of Search .................... 395/100–105, 395/109, 114–117, 127–129, 133, 137, 143, 149, 150, 151, 155, 158, 161; 345/135

[56] References Cited

U.S. PATENT DOCUMENTS

| | | | |
|---|---|---|---|
| 4,675,830 | 6/1987 | Hawkins | 395/158 |
| 4,680,720 | 7/1987 | Yoshii et al. | 395/151 |
| 4,740,904 | 4/1988 | Nagle | 395/103 X |
| 4,780,711 | 10/1988 | Doumas | 345/137 |
| 5,001,653 | 3/1991 | Buchanan et al. | 395/102 |
| 5,077,679 | 12/1991 | Williamson et al. | 395/105 |
| 5,150,454 | 9/1992 | Wood et al. | 395/103 X |
| 5,216,753 | 6/1993 | Ng | 395/109 |
| 5,272,471 | 12/1993 | Asada et al. | 345/149 |

*Primary Examiner*—Almis R. Jankus
*Attorney, Agent, or Firm*—Mark A. Aaker

[57] ABSTRACT

From a matrix of elements representing an image, coordinates of each end of lines in a parallel array are generated. The lines in the array join adjacent elements in the same binary state. The coordinates are communicated to a vector graphics device which draws the array of parallel lines to form a graphic representation of the image.

12 Claims, 6 Drawing Sheets

5,500,924

METHOD FOR VECTOR PLOTTING A BITMAP WITH A REDUCED NUMBER OF LINES

BACKGROUND OF THE INVENTION

The present invention relates in general to graphic presentation of bitmap images. It relates in particular to forming a graphic representation of a bitmap image on a vector graphics device such as a vector display or a pen plotter.

A computer-generated graphic is made up of a set of discrete color values or discrete shades of gray. These discrete values are generally referred to as picture elements or pixels. The picture elements are arranged in a regular rectangular matrix, forming in effect a raster grid. Such a matrix is termed a pixel map or pixmap.

Each picture element is represented by a binary code including one or more bits. In a high-resolution color pixmap, the picture elements may be represented, for example, by twenty-four bits, eight bits for each of three additive primary colors, red, green and blue.

A pixmap of a graphic is easily displayed on a computer CRT display as the CRT is raster-oriented. However, a pixmap can not be displayed on a vector-oriented device such as a vector display or a pen plotter; such devices are not designed to respond to signals in pixmap form.

Attempts have been made to output raster-oriented data on a pen plotter by converting a pixmap into a bitmap. In a bitmap each element is represented by only one bit of information. The bit can have either of two binary states, for example, black or white. The black elements in the bitmap are then drawn, one by one, on the plotter.

The above-described method of bitmap plotting produces poor results for several reasons. For example, while a pen plotter has an addressable resolution which may be as high as two-thousand dots per inch (2000 dpi), the effective resolution of the plotter is constrained by the width of a line drawn by a plotter pen. In most pen plotters the effective resolution is about 72 dpi or less. Accordingly, it is difficult to produce an acceptable halftone graphic, on a pen plotter, directly from a graphic bitmap.

When a bitmap graphic is plotted on a pen plotter, the plotter draws a short line representing each black element or dot in the bitmap. This may be a very slow process, since a graphic may contain over one-hundred-fifty-thousand black dots. Further, drawing such short lines causes the plotter to operate with a pecking motion. The pecking motion accelerates wear on the plotter pen to the point where dot size may be considerably larger at the end of the plot than it was at the beginning.

In order to plot a colored graphic, the graphic must be plotted at least three times, once from each of three separate bitmaps, each bitmap representing one of three subtractive primary color components of the graphic, i.e., cyan, magenta and yellow (CMY). Because of this, the above-described problems of plotting a monochrome bitmap are greatly magnified.

SUMMARY OF THE INVENTION

The present invention is directed to drawing a graphic representation of an image using a vector graphics device such as a pen plotter.

The method comprises forming a matrix of elements representing the image. Each of the elements is in one of two binary states. From the matrix, coordinates of each end of lines in a parallel array are generated. The lines in the array join adjacent elements in the same binary state. The coordinates are communicated to a vector graphics device which draws the array of parallel lines to form a graphic representation of the image. The parallel lines are preferably oriented at a forty-five degree angle to the image.

In implementation of the invention, an image may be partitioned into a rectangular first matrix of grayscale elements. Each of the grayscale elements has one of a predetermined plurality of grayscale values. A filter is applied to the first matrix to provide a rectangular second matrix of halftone elements, each thereof in one of two binary states. The filter causes groups of halftone elements in the same binary state to be preferentially aligned at about a forty-five-degree angle with respect to the image. Coordinates of a plurality of parallel lines, oriented at a forty-five-degree angle to the image and joining adjacent halftone elements, are generated from the second matrix, and the lines are plotted on a vector graphics device to form a graphic representation of the image.

In another embodiment of the present invention, first, second, and third matrices of halftone elements are formed. The first, second, and third matrices represent respectively cyan, magenta, and yellow components of a color image. The first, second, and third matrices are used to generate coordinates of lines forming first, second, and third pluralities of parallel lines. The three pluralities of lines are drawn on a vector graphics device. The first plurality of lines is drawn in cyan color, the second plurality of lines is drawn in yellow color, and the third plurality of lines is drawn in magenta color.

Each of the pluralities of lines has a different orientation with respect to the colored image. Preferably, the first and second pluralities are oriented at ninety degrees to each other and one of the first and second pluralities is oriented at a forty-five-degree angle with respect to the image. The third plurality of lines may be oriented either horizontally or vertically with respect to the image. Together, the three pluralities of lines drawn by the vector graphics device form a color graphic representation of the color image.

BRIEF DESCRIPTION OF THE DRAWING

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE INVENTION

Figure 1:
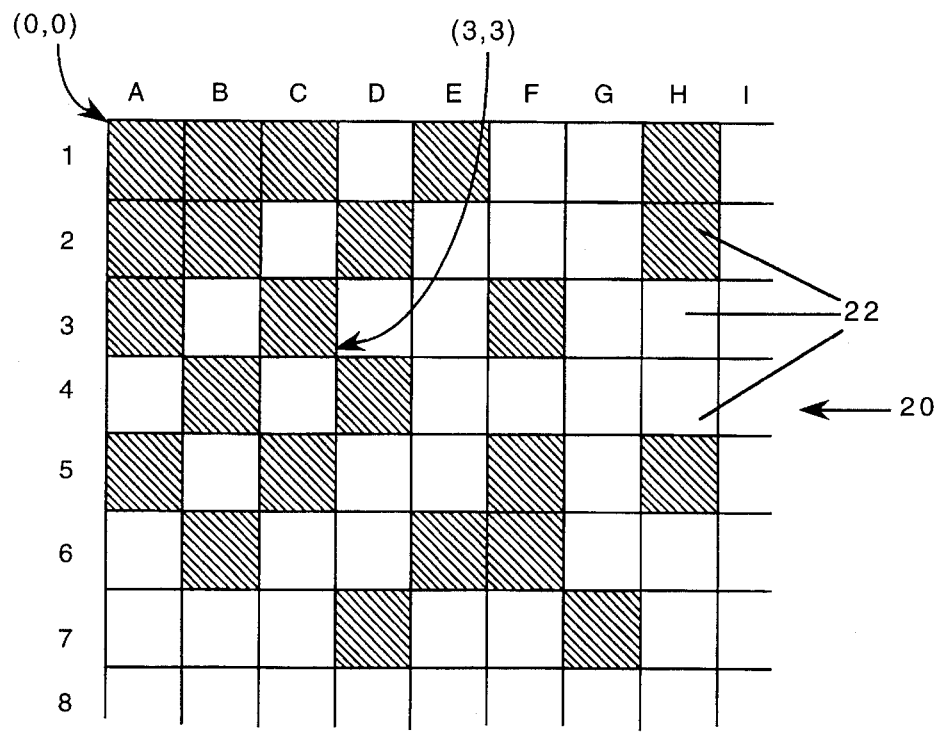
FIG. 1 schematically illustrates details of a corner of a halftone bitmap including adjacent and isolated elements.

Turning now to the drawings, FIG. 1 shows an enlarged view of an upper left corner 20 of a arbitrary halftone bitmap as it may appear on a computer CRT display. The bitmap consists of a matrix of squares 22, generally referred to as picture elements or pixels. Grid lines in FIG. 1, of course, do not appear on a display and are included here only for convenience of description.

The picture elements are either white as in square D1, or dark (black) as in square A1. When stored in computer memory, the elements would be in one of two binary bit states, "on" or "off" (true or false). Whether "on" or "off" represents black is generally determined by the form of display, for example, white on black or black on white. For the purposes of this discussion, the convention black is "on" (true) is adopted.

A picture element 22 on a display has a finite size, generally about one seventy-second of an inch. Normally, an element is specified in computer code by coordinates representing the upper left corner of the element. For example, element A1 has coordinates (0,0), and element D4 has the coordinates (3,3). The elements are designated in FIG. 1 by row number and column letter only for convenience of description.

It can be seen in FIG. 1 that a black element, for example, element B2, may have other black elements, such as elements B1, A2, and C3, immediately adjacent. Element B1 may be referred to as vertically adjacent, element A2 as horizontally adjacent, and element C3 as diagonally adjacent.

A line may be specified on a vector graphics device by beginning and ending coordinates. As such, if a horizontal, vertical, or diagonal string of adjacent elements in the same binary state (black) is to be represented on a vector device by a line joining the elements, the line may be conveniently specified in terms of the coordinates of the first and last elements in the string.

Isolated elements, i.e., elements not having an adjacent element in the same binary state in a particular string orientation, are not suitable for representation in line form on a vector device.

The method of the present invention involves generating line coordinates from bits in a bitmap. The method ignores those elements in the bitmap which would be isolated in a desired line orientation. The method will be described explicitly with reference to the bitmap corner 20 of FIG. 1. Computer codes which may be used for implementing the method are well known to those familiar with the art.

In describing the method, it is assumed that parallel lines oriented at a forty-five-degree angle to an image represented by bitmap 20 are desired. A forty-five-degree line orientation is preferred because it is less perceptible to the human eye than a vertical or horizontal line orientation. It should be noted that in most computer display coordinate conventions, downward is usually positive. In this convention, a line oriented at a forty-five-degree angle extends from upper left to lower right in the display. In a conventional (Cartesian) coordinate system, such a line could be described as oriented at a negative forty-five-degree angle. For purposes of this description the terminology "a forty-five-degree angle" is used to satisfy both conventions.

Continuing now with reference to FIG. 1, adjacent forty-five-degree diagonals of the bitmap are scanned to generate line coordinates. When a diagonal is scanned, the first black element detected is used to generate a beginning coordinate of a line. The scan continues along the diagonal until a white element is detected. The black element preceding this white element is then used to determine the ending coordinates of the line. The scan continues until coordinates of all lines along a diagonal have been specified.

A black element preceded by and followed by a white element in the scan direction is ignored, i.e., it is not used to generate coordinates. At the beginning of a diagonal, if the first element is black and the following element is white, the first element is ignored. At the end of the diagonal, if the last element is black and the preceding element is white, the last element is ignored.

All adjacent diagonals may be scanned as described above to create a graphic representation of the bitmap image having the highest possible resolution. Alternatively, only diagonals spaced apart at predetermined intervals may be scanned, for example, to create a special graphic effect.

Figure 2:
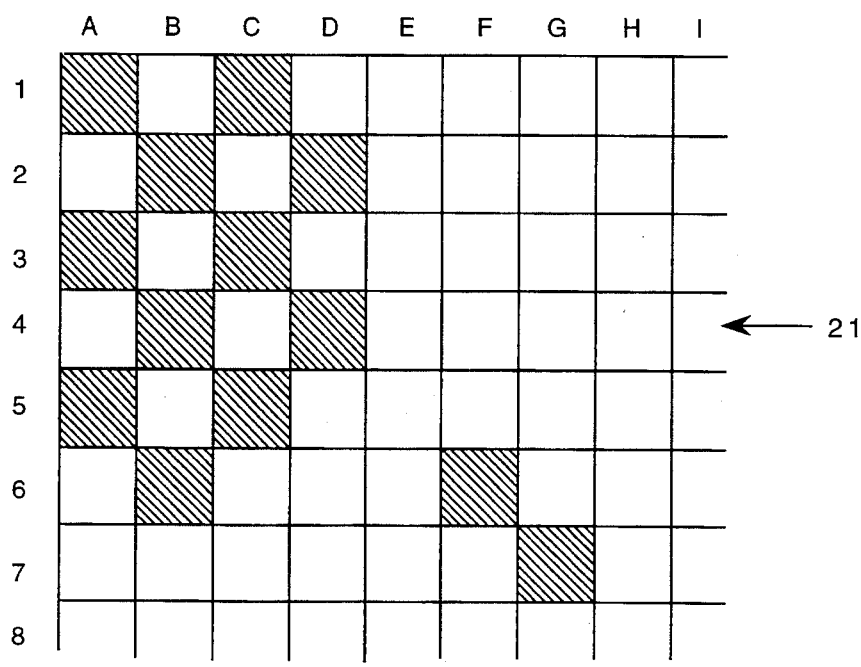
FIG. 2 schematically illustrates the bitmap corner of FIG. 1 with isolated elements eliminated.

Turning now to FIG. 2, a bitmap corner 21 is shown. Bitmap corner 21 is formed by removing from bitmap 20 all isolated elements in an (upper left to lower right) forty-five-degree scan direction.

It will be evident that the scan direction is important in determining whether or not an element of a bitmap is isolated. Elements F5, E6, and D7 of FIG. 1, for example, are all isolated in an upper-left-to-lower-right forty-five-degree orientation, but are not isolated in an upper-right-to-lower-left forty-five-degree direction. Element E6 is not isolated in a horizontal direction.

Figure 3:
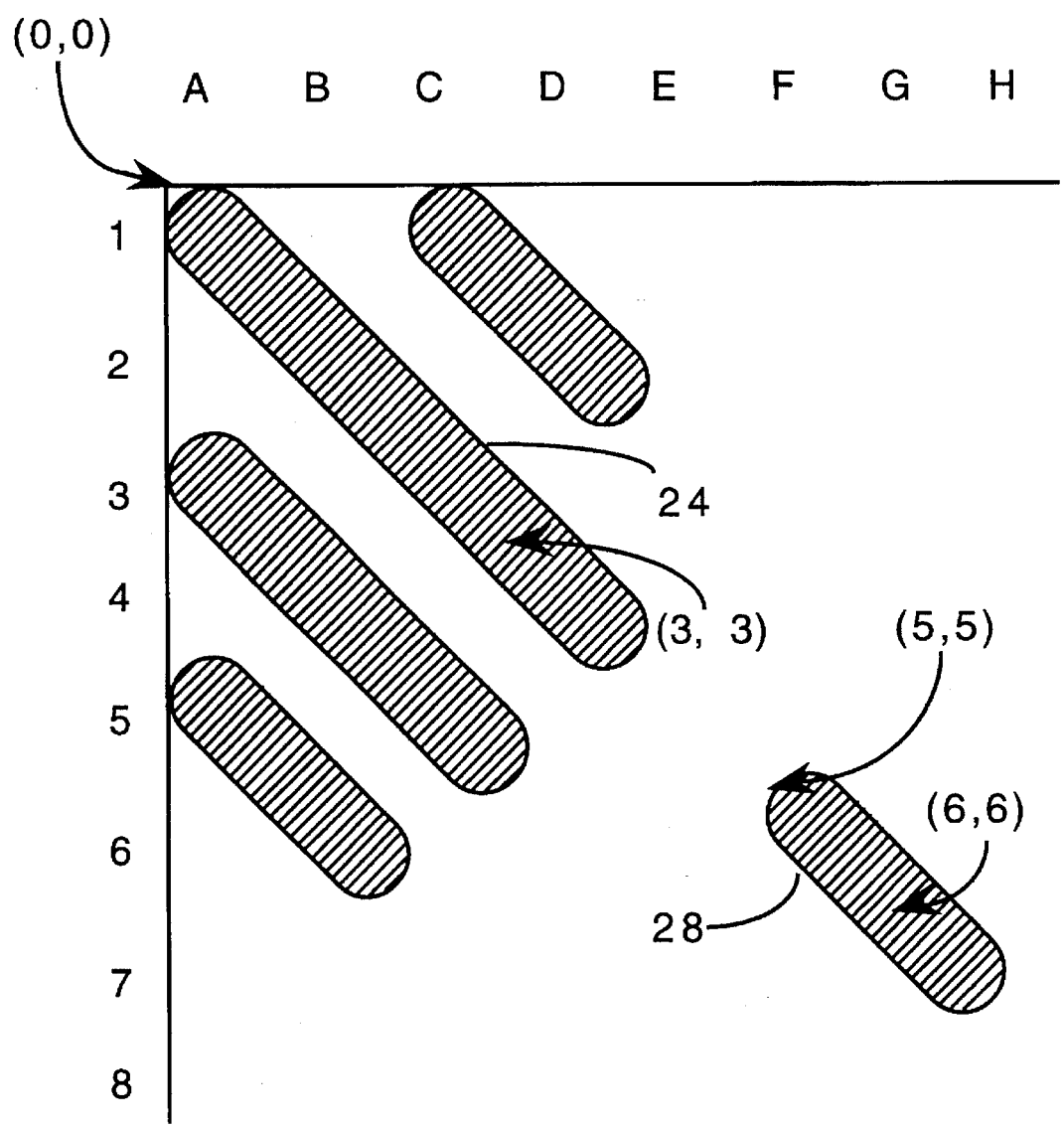
FIG. 3 schematically illustrates parallel forty-five-degree lines joining adjacent elements of FIG. 2 having the same binary state.

Referring now to FIG. 3, a plurality of parallel lines is shown. The lines join elements of FIG. 2 having the same binary state. The lines are drawn to simulate the magnified appearance of lines drawn between predetermined coordinates by a pen plotter. Line 24, for example, is drawn between coordinates (0,0) and (3,3). Line 28 is drawn between coordinates (5,5) and (6,6).

Figure 4:
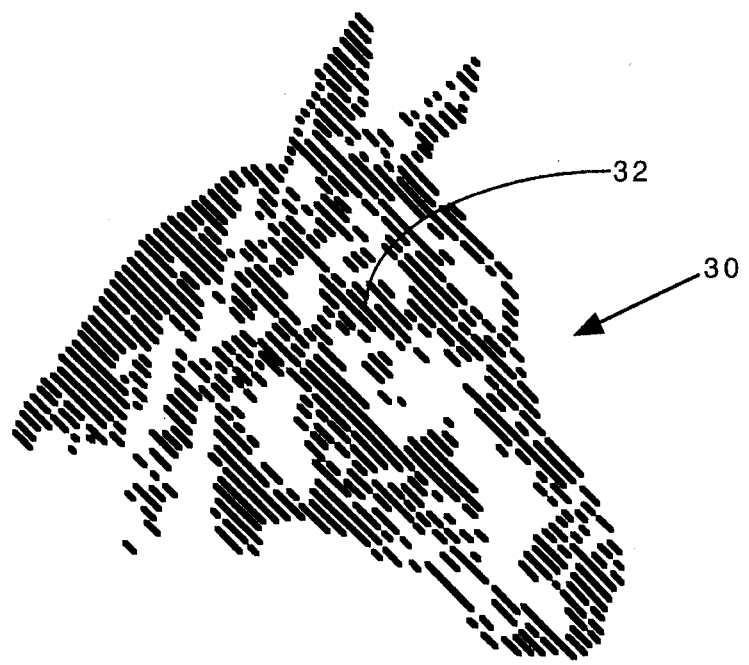
FIG. 4 schematically illustrates a forty-five-degree line drawing made from a halftone bitmap using an embodiment of the present invention.

The description will now be continued with reference to a recognizable image to show graphic effects created by the present invention. Referring now to FIG. 4, a graphic representation 30 of a halftone bitmap of a horse's head, drawn according to the method of the present invention, is shown. The graphic representation comprises a plurality or array of parallel lines of various lengths. All lines are equally oriented. It is drawn as it would appear if drawn on a pen plotter having an effective resolution of about 36 dpi. Lines are spaced at about 18 dpi so that they are separate and recognizable.

Figure 5:
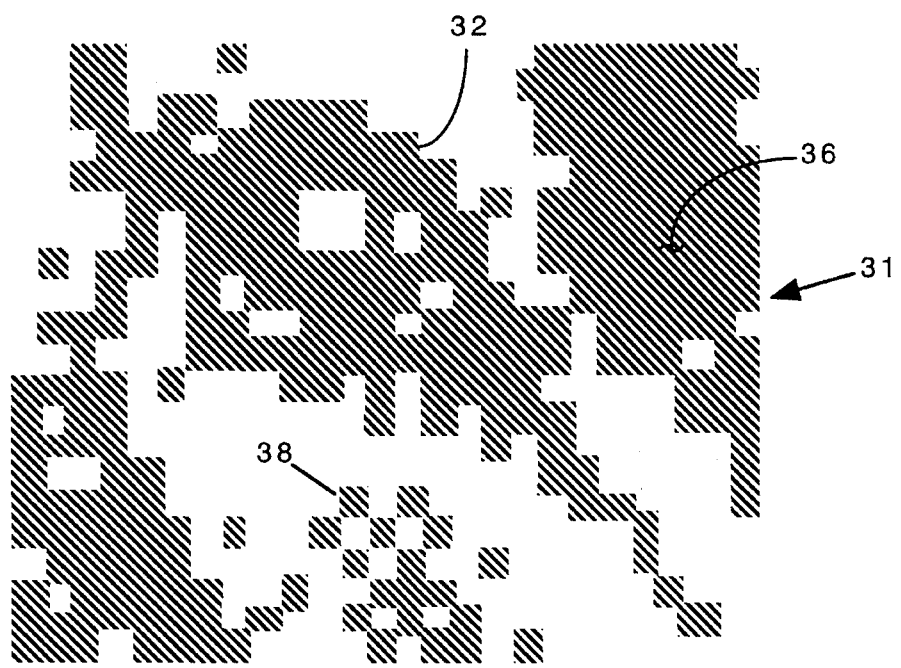
FIG. 5 schematically represents an enlarged portion of the halftone bitmap used to make the drawing of FIG. 4

Detail 31 of the bitmap, from which the graphic representation of FIG. 4 was generated, is shown in FIG. 5. The detail shows elements in eye region 32 of drawing 30 (see FIG. 4). Large shaded areas of FIG. 5, such as area 36, are made up of many individual, adjacent black elements each the size of element 38. It can be seen by comparing FIGS. 4 and 5 that hundreds of elements in the bitmap have been reduced to about thirty lines in corresponding area of graphic 30.

Another method of determining line coordinates may be used if even fewer line drawing operations are desired. In this method, isolated white spaces are ignored as well as black spaces. Referring again to FIG. 1, it will be seen that in an upper-left-to-lower-right forty-five-degree scan, white dot E5 is preceeded and followed by a black dot. Accordingly, E5 may be considered isolated and ignored. In this case, a line would be drawn joining coordinates (0,0) and (6,6), i.e., one line would take the place of lines 24 and 28 of FIG. 3. It will be appreciated, however, that while this method may result in few lines being drawn and less time required to make a drawing, some loss of graphic quality may result.

A halftoning method suitable for use for producing halftone bitmaps compatible with the present invention will next be described. Techniques for producing halftone bitmaps, in general, are not discussed in detail here as they are well known and documented, for example, in a book, *Digital Halftoning*, Robert Ulichney, MIT Press, Cambridge, Massachusetts, which is herein incorporated by reference. A halftoning method, briefly described below, is advantageous in the present invention as it produces a bitmap in which groups of elements are preferentially aligned in a forty-five-degree direction with respect to an original image from which the bitmap is produced.

First, a grayscale pixmap of a continuous-tone monochrome image is produced. The pixmap comprises a matrix of elements each having one of a predetermined plurality of grayscale values, preferably two-hundred-fifty-six values.

A filter is then applied to the pixmap to convert grayscale values to halftone elements in a bitmap. The filter comprises an n×n matrix of threshold values, where n is an integer, preferably five. An example of such a matrix is shown in Table 1.

TABLE 1

| 4  | 7  | 12 | 15 | 17 |
|----|----|----|----|----|
| 10 | 2  | 5  | 11 | 15 |
| 14 | 8  | 1  | 6  | 12 |
| 16 | 13 | 9  | 3  | 7  |
| 17 | 16 | 14 | 10 | 4  |

The filter is applied to adjacent groups or sub-matrices of n×n elements of the grayscale matrix. An element of the grayscale matrix having a value greater than the corresponding threshold value in the filter is given the value true or black.

The threshold values in the filter matrix are arranged such that they are of about the same magnitude along any one of the parallel matrix diagonals. The center, i.e., the longest, diagonal in the matrix is given the lowest values. The magnitude of values is increasingly greater along diagonals increasingly distant from the center diagonal.

The effect of the filter of Table 1 is to generate from the grayscale matrix a bitmap or halftone matrix including groups of elements wherein elements having the same binary state are preferentially aligned at a forty-five-degree angle to the original image. This has been found to create less isolated points in a preferred scan orientation of a bitmap, and, as a result, to provide more effective graphic effects when the bitmap is drawn by the method of the present invention.

The method of the present invention is described above in the context of providing a graphic representation of a monochrome image. Set forth below is a method for drawing, on a vector device, a color graphic representation of a color image.

First, second, and third halftone bitmaps representing respectively cyan, magenta, and yellow color separations of the color image are produced. A method for producing such color separation is not discussed as such methods are well known to those familiar with the art.

From the first, second, and third bitmaps, coordinates of first, second, and third pluralities of parallel lines are generated, as discussed above in reference to FIGS. 1–5. Each plurality of parallel lines has a different orientation with respect to the image.

The first plurality of parallel lines may be drawn on a vector graphic device in cyan color, the second plurality in magenta color, and the third plurality in yellow color. The first and second (cyan and magenta) pluralities are preferably oriented at ninety degrees to each other, with either the first or second set oriented at a forty-five-degree angle to the image. The third (yellow) plurality may be oriented horizontally or vertically with respect to the image. As yellow is the least perceptible of the subtractive primary colors, the aesthetic effect of vertically or horizontally oriented yellow lines has not been found to be unpleasant or distracting.

It should be noted that the pluralities of lines have been designated first, second, and third for purposes of describing relative orientation of the pluralities of lines and not to designate an order in which they are drawn. It has been found in practice that it is preferable to draw yellow lines (the third plurality) first, and thereafter cyan and magenta lines in any convenient sequence.

Figure 6:
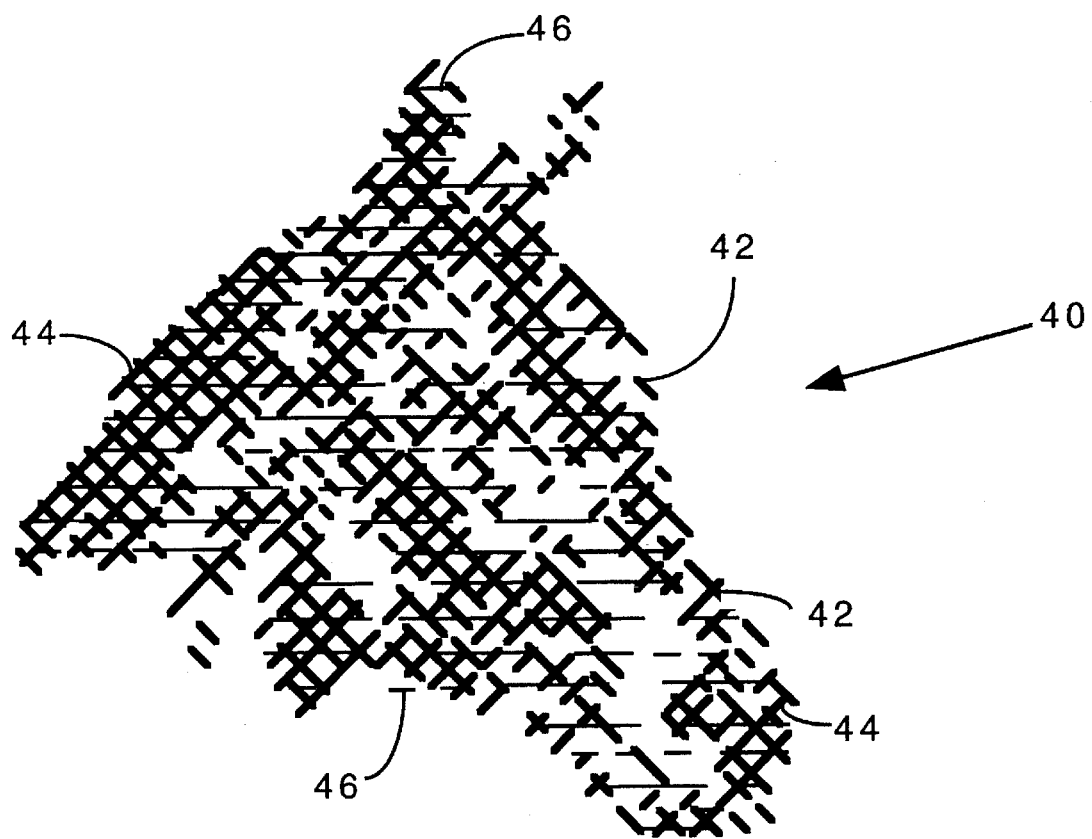
FIG. 6 schematically illustrates a method of drawing a color image using three differently-oriented pluralities of parallel lines.
Figure 7:
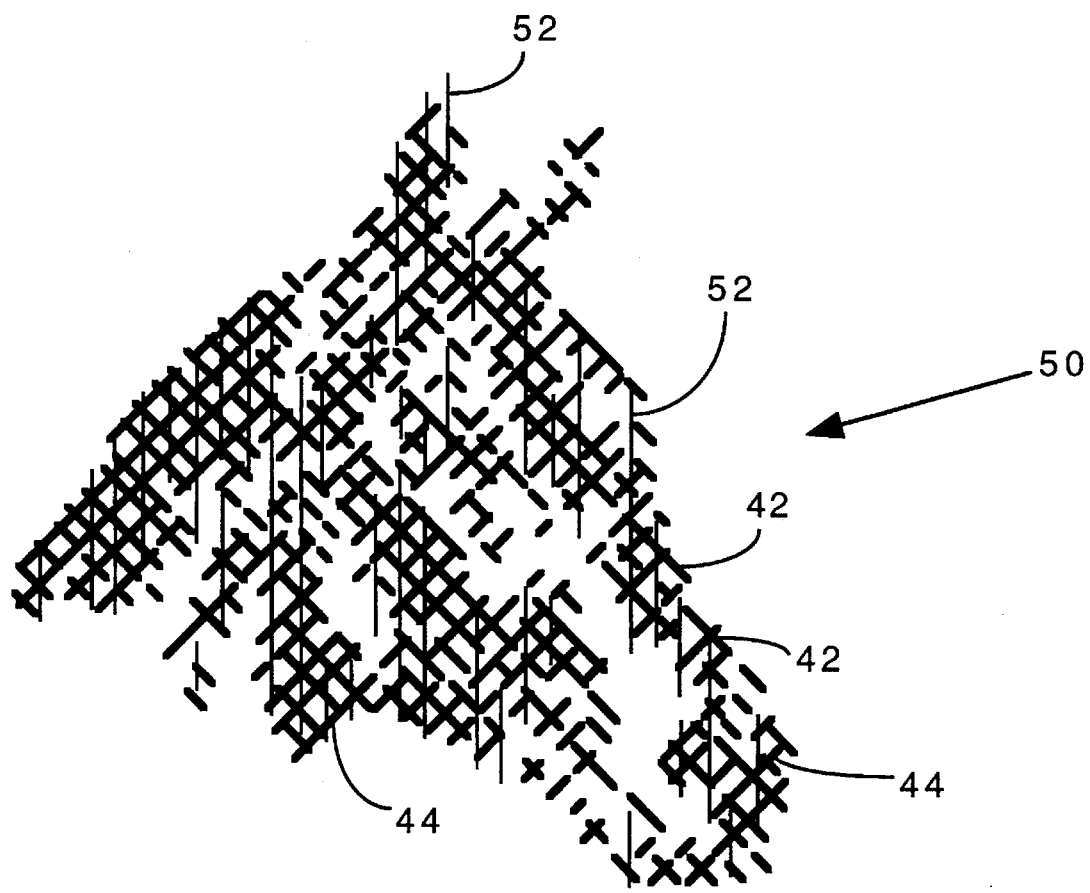
FIG. 7 schematically illustrates another method of drawing a color image using three differently-oriented pluralities of parallel lines.
Figure 8:
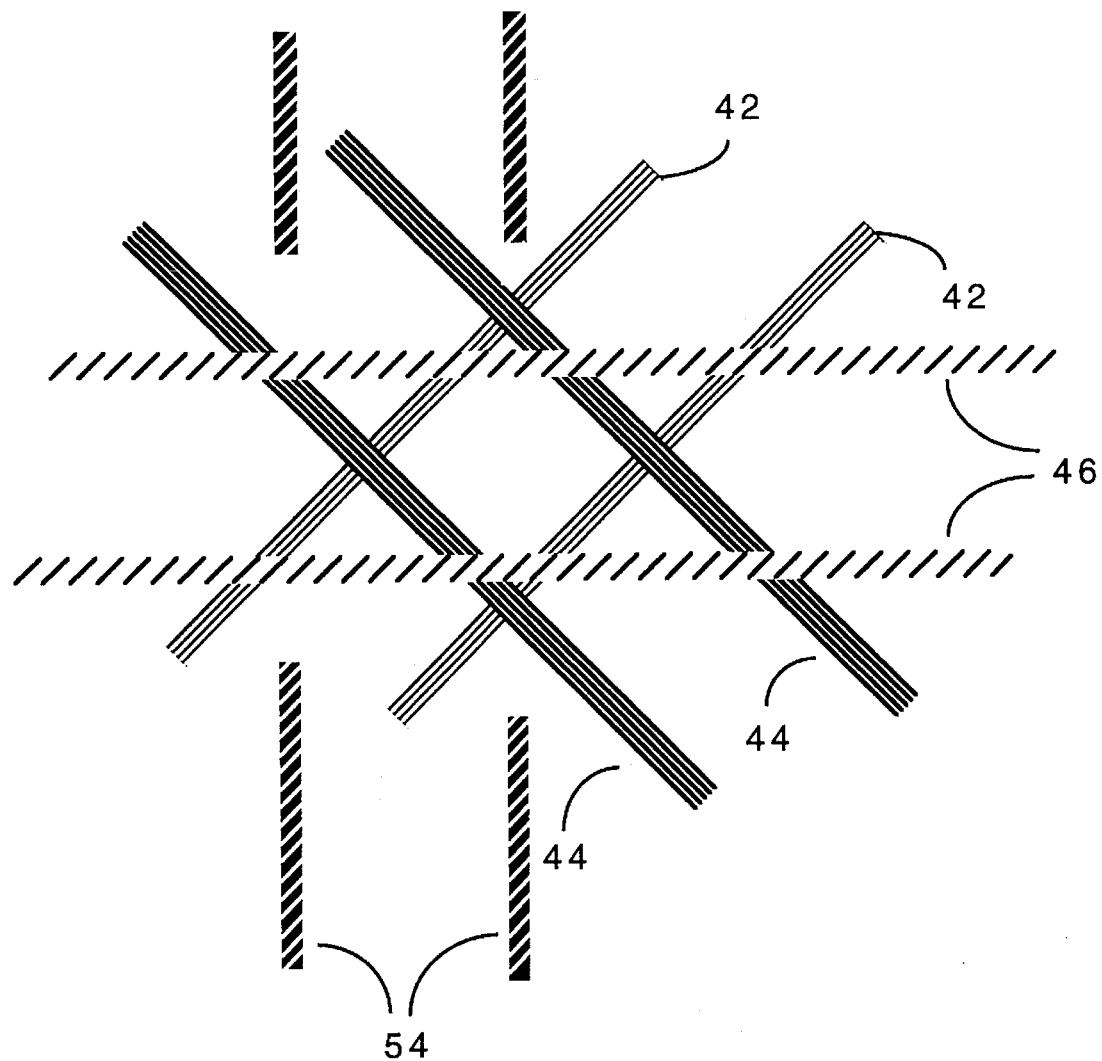
FIG. 8 schematically illustrates details of a respective orientation of four pluralities of parallel lines for drawing a color image.

Referring to FIG. 6, a monochrome representation of the above-described color drawing method is depicted. Here, graphic 40 includes plus forty-five-degree-oriented lines 42 representing cyan color lines, minus forty-five-degree-oriented lines 44 representing magenta lines, and horizontally-oriented lines 46 representing yellow lines. In FIG. 7, graphic 50 includes vertically-oriented lines 52 representing yellow lines.

The low perceptibility of the yellow lines with respect to the cyan and magenta lines is represented in FIGS. 6 and 7 by drawing lines 46 and 48 finer than lines 42 and 44. In practice, however, the same line width is generally used for all colors.

Continuing with reference to FIGS. 6 and 7, parallel lines in graphics 40 and 50 are depicted as having a relatively wide spacing. As such, graphics 40 and 50 are most effective if viewed from a relatively long distance. The wide line-spacing is chosen in FIGS. 6 and 7 to show the differently oriented lines separate and recognizable. It has been found, however, when drawing with a pen plotter, a wide line-spacing is practically effective in reducing blending or running together of different colored inks at or near intersections of differently oriented lines.

It will be evident to those familiar with the art that a colored graphic drawn by the above-described method may include a fourth plurality of lines, representing a black component of an image, as included by a cyan, yellow, magenta, and black (CMYK) graphics device. The fourth plurality of lines is generated from a fourth matrix of halftone elements representing the black component.

Referring now to FIG. 7 detail, a relative orientation of lines in a CMYK graphic is shown. Here cyan and magenta lines, 42 and 44 respectively, have a forty-five-degree orientation. Yellow lines 46 are horizontally oriented and black lines 54 are vertically oriented. In practice, including black lines has been found in many instances not to significantly improve results since the black lines tend to dominate in the image. Further, the probability of ink blending at line intersections is increased due to a relatively large number of intersections.

The present invention has been described in terms of a preferred embodiment and an alternate embodiment. The invention, however, is not limited to the embodiments described and depicted. Rather, the scope of the invention is defined by the appended claims.

What is claimed is:

1. A method of drawing using a vector graphics device, comprising:

forming a matrix of picture elements, each element thereof in one of two binary states, and said elements representing an image;

generating from said matrix, coordinates of each end of diagonal lines parallel to each other and oriented in a predetermined direction, each of said lines joining adjacent elements having a same binary state;

communicating said coordinates to the vector graphics device; and drawing said diagonal lines with the vector graphics device to form a graphic representation of said image.

2. The method of claim 1 wherein said diagonal lines are oriented at about a forty-five-degree-angle.

3. A method of drawing using a vector graphics device, comprising:

partitioning an image into a rectangular first matrix of grayscale elements, each grayscale element having one of a predetermined plurality of grayscale values;

applying a filter to said matrix to provide a rectangular second matrix of halftone elements, each halftone element thereof in one of two binary states, said filter being characterized by a filter matrix of threshold values having about the same magnitude along any one of a set of parallel matrix diagonals;

generating from said second matrix, coordinates of each end of each one of an array of diagonal parallel lines, each line joining adjacent elements in the same binary state;

communicating said coordinates to the vector graphics device; and drawing said array of parallel lines with the vector graphics device to form a graphic representation of said image.

4. The method of claim 3 wherein said filter is applied sequentially to adjacent submatrices of grayscale elements of said first matrix, said threshold values determining a binary state for corresponding halftone elements in corresponding submatrices of said second matrix.

5. The method of claim 4 wherein said threshold values are arranged such that threshold values along adjacent diagonals of said filter matrix are of about the same magnitude, threshold values along a central forty-five-degree diagonal are lower than any other threshold values, and threshold values are increasingly higher along diagonals increasingly distant from said center diagonal.

6. A method of drawing using a vector graphics device, comprising:

forming first, second, and third matrices of elements, each of said elements in one of two binary states, said first, second, and third matrices representing, respectively, cyan, magenta, and yellow components of a color image;

generating from said first, second, and third matrices, respectively, first, second, and third sets of coordinates, said first, second, and third sets of coordinates representing, respectively, first, second, and third pluralities of parallel lines oriented in predetermined directions, each of said first, second, and third pluralities of parallel lines not being parallel to any other one of said first, second, and third pluralities of parallel lines, and each one of said parallel lines joining adjacent elements in the same binary state;

communicating said first, second, and third sets of coordinates to the vector graphics device; and drawing, using the vector graphics device, said first plurality of parallel lines in a cyan color, said second plurality of parallel lines in a magenta color, and said third plurality of parallel lines in a yellow color, thereby forming a colored graphic representation of said image.

7. The method of claim 6 wherein said first and second pluralities of parallel lines are oriented perpendicular to each other, and are diagonal.

8. The method of claim 7 wherein said third plurality of parallel lines is oriented horizontally with respect to said image.

9. The method of claim 7 wherein said third plurality of parallel lines is oriented vertically with respect to said image.

10. The method of claim 6 further including forming a fourth matrix of elements, each of said elements in one of two binary states, said fourth matrix representing a black component of a color image;

generating from said fourth matrix a fourth set of coordinates, representing a fourth plurality of parallel lines, each line joining adjacent elements in the same binary state, and said fourth plurality of parallel lines having an orientation different from the orientation of said first, second, and third pluralities of parallel lines;

communicating said fourth set of coordinates to the vector graphics device; and drawing said fourth plurality of parallel lines in a black color, using the vector graphics device.

11. A method comprising:

providing an array of picture elements representing an image, each picture element in a binary state;

changing the binary state of picture elements having at least one predetermined binary state and which are isolated along a predetermined direction;

generating from said array, coordinates of parallel lines oriented in said predetermined direction, said lines formed by picture elements of the same binary state; and communicating the coordinates to a vector graphics device for producing a graphic representation of the image.

12. The method of claim 11 wherein said parallel lines are spaced apart at predetermined intervals.

* * * * *